United States Patent
Nilsson

[11] 3,980,562
[45] Sept. 14, 1976

[54] MAGNETIC DISK SEPARATOR WITH SCRAPER MEANS

[75] Inventor: Harald Nilsson, Helsingborg, Sweden

[73] Assignee: Allmanna Svenska Elektriska Aktiebolaget, Vasteras, Sweden

[22] Filed: Mar. 31, 1975

[21] Appl. No.: 563,502

[30] Foreign Application Priority Data
Apr. 22, 1974 Sweden .............................. 7405351

[52] U.S. Cl. .............................. 210/222; 209/232; 209/252; 209/229
[51] Int. Cl.² .......................................... B01D 35/06
[58] Field of Search ............... 209/223 R, 219, 222, 209/232, 228, 229, 214; 210/222, 223

[56] References Cited
UNITED STATES PATENTS

| 9,610 | 3/1855 | Gardiner .......................... 209/229 X |
| 405,045 | 6/1889 | Mowrer ............................ 209/229 |
| 786,946 | 4/1905 | Bennett ........................... 209/229 X |
| 2,094,615 | 10/1937 | Parker ............................ 209/232 X |
| 2,459,343 | 1/1949 | Scrivener ......................... 210/222 |
| 2,736,432 | 2/1956 | Gardes ............................ 209/219 X |
| 3,062,376 | 11/1962 | Davis ............................. 210/222 |
| 3,168,464 | 2/1965 | Ferry ............................. 209/223 R |
| 3,349,918 | 10/1967 | Ike ............................... 210/223 |

FOREIGN PATENTS OR APPLICATIONS

| 570,355 | 7/1945 | United Kingdom .............. 209/232 |
| 16,643 | 11/1905 | United Kingdom .............. 209/219 |
| 151,969 | 7/1961 | U.S.S.R. ..................... 209/222 |
| 242,797 | 9/1969 | U.S.S.R. ..................... 209/222 |

*Primary Examiner*—Robert Halper

[57] ABSTRACT

A magnetic separator is formed of a number of substantially parallel filter discs which are attached on a rotatable shaft extending radially therefrom with gaps between the discs. The discs are arranged to produce local magnetic field inhomogeneities in the gap between the discs. Stationary scraper means in the form of channel-like bodies of plastic material are arranged between each pair of discs with their free edges engaging the opposed faces of the discs. An endless belt is arranged to run in the channel for carrying out the material scraped from the discs to the outside.

3 Claims, 7 Drawing Figures

MAGNETIC DISK SEPARATOR WITH SCRAPER MEANS

BACKGROUND OF THE INVENTION

1. Field of the Invention

The invention relates to a magnetic separator formed of parallel discs extending radially from a horizontal shaft.

It is well-known that liquids contaminated with suspended particles or dissolved high-molecular substances, such as resinous substances, can be cleaned by adding a ferromagnetic particulate material, such as magnetite, iron, cobalt or nickel, to the liquid and separating the contamination together with the ferromagnetic material in a magnetic field. It is also known to clean liquids in a similar way, which liquids from the start contain contaminations of ferromagnetic particulate materials, for example departing coolant from machines for mechanical machining, such as lathes and drills. Also contaminated gases can be cleaned in principle by the addition of a ferromagnetic particulate material and treatment in a magnetic field for separation of the contaminations. It is also known to use chemical flocking agents simultaneously in the cleaning process, for example lime, alum, iron chloride, polyelectrolytes and water glass.

2. The Prior Art

In the described cleaning operations a magnetic separator is used. One known embodiment of such a separator consists of a rotatable cylindrical drum which is lowered down into a trough which is concentric with the drum, so that a gap is formed between the envelope surface of the drum and the trough. A plurality of permanent magnets are arranged in longitudinal rows on the inside of the envelope surface of the drum, and the medium to be cleaned is led through the gap at the same time as the drum is rotated. The separator is also provided with a scraper for removing the material which adheres to the drum during the separation so that the process is continuous. The magnets can either rotate with the drum or be stationary during the rotation of the drum.

Another known embodiment of a magnetic separator is formed with a gap between two plane parallel rigid walls, one of which contains a plurality of horseshoe magnets built into it, and located adjacent to and spaced from each other.

Proposals have also been made to provide magnetic separators, the walls of which consist of ferromagnetic material and are attached, radially directed, along a rotatable shaft, the separator being provided with a stationary magnet with the ability to generate a magnetic field, substantially parallel with the rotatable shaft, with local gradients. To achieve a practical embodiment of such a separator, bulky and very expensive magnetization devices are required, such as an iron circuit and a magnetization coil. The scraper means may be of a finger-like type.

According to the Lundquist application, Ser. No. 440,872, filed Feb. 8, 1974, there is provided a magnetic separator with an extremely large separating surface without the use of bulky and expensive magnetization devices and with a very efficient scraping during practical operation. In this way an extremely compact separator is achieved. This result is obtained by designing the separator as a disc filter, in the filter discs of which permanent magnets are arranged in such a way that local field inhomogeneities occur in the gaps between the discs, and by designing the scraper means as endless transport members which enter into the gaps and carry away the material removed from the filter discs.

The filter discs in the separator according to the Lundquist invention are normally constructed with smooth outer walls between which the permanent magnets are positioned. The walls then consist of a non-magnetic material, for example stainless steel-sheet, aluminium or resin, for example an epoxy resin into which the permanent magnets are then suitably cast.

According to one embodiment of Lundquist the permanent magnets are in the form of discrete magnets arranged to extend between supporting walls of the discs, said walls facing the gaps. The magnets should then have great coercive field strength in order that they may be made short and the separator thus compact. Particularly preferred are ceramic magnets such as barium or strontium ferrite, which have a coercive field strength exceeding 100 kA/m, but in principle it is also possible to use metallic magnets with great coercive field strength, such as samarium-cobalt magnets. It is particularly favorable to use anisotropic magnets, since these have greater coercive field strength than the corresponding isotropic magnets, for barium and strontium ferrite, for example, a coercive field strength of more than 200 kA/m.

In order to make the filter surface as large as possible, it is suitable to arrange the permanent magnets along substantially the whole extension of the discs. To facilitate the scraping off it may be advantageous, however, to omit magnets within limited, preferably sector-shaped areas, since agglomerated particulate material can be detached more easily from the discs if they are provided with distinct areas without magnets.

SUMMARY OF THE INVENTION

More particularly, the present invention relates to a magnetic separator comprising a number of substantially parallel filter discs which are attached, radially directed, along a rotatable shaft, and with gaps between the discs for passage of the medium which is to be cleaned, said medium when entering the separator containing a ferromagnetic particulate material, local field inhomogeneities being generated in the gaps between the filter discs, and the separator being provided with a stationary scraper means for the particulate material which adheres to the discs when the medium passes the gaps, characterised in that the filter discs contain permanent magnets and that below the scrapers there are arranged endless transport belts for scraped off particulate material, said transport belts entering the gaps and extending outside the filter discs.

The scraper means are preferably made of plastic material, such as polyamide, polytetrafluoro ethylene, polycarbonate, polyacetal and polyphenylene oxide. By constructing them of such a material they can be made to fit closely to the filter discs without exposing the discs to wear.

It is particularly suitable that two scraper means located in the same gap are arranged to form a coherent unit together with a channel located underneath them, in which a transport belt runs.

By constructing the scraper means so as to cooperate with endless transport belts which enter the gaps and extend outside the filter discs, an efficient removal of contaminations is achieved. The continuous removal of contaminations also causes the scraping as such to become more efficient by the fact that agglomeration of contaminations in the separator is avoided. The transport belts can be arranged to surround and be driven by the shaft of the separator. However, they can also be driven by a drive means located outside the filter discs, for example with a motor-driven roll. In this latter case the separator can be driven by the transport belts if these belts surround the separator shaft. To serve as transport belts, however, they do not have to surround the separator shaft, but each one may surround a separate and centrally located roll. The use of the same drive means for the separator shaft and for the transport belts contributes to make the separator compact. The transport belts are formed, for example, of stainless steel, rubber or resin.

The filter discs in the separator according to the invention are normally constructed with smooth outer walls between which the permanent magnets are positioned. The walls then consist of a non-magnetic material, for example stainless steel-sheet, aluminium or resin, for example an epoxy resin into which the permanent magnets are then suitably cast.

According to one embodiment of the invention the permanent magnets are in the form of discrete magnets arranged to extend between supporting walls of the discs, said walls facing the gaps. The magnets should then have great coercive field strength in order that they may be made short and the separator thus compact. Particularly preferred are ceramic magnets such as barium or strontium ferrite, which have a coercive field strength exceeding 100 kA/m, but in principle it is also possible to use metallic magnets with great coercive field strength, such as samarium-cobalt magnets. It is particularly favourable to use anisotropic magnets, since these have greater coercive field strength than the corresponding isotropic magnets, for barium and strontium ferrite, for example, a coercive field strength of more than 200 kA/m.

According to another embodiment of the invention, permanent magnet material consisting of plastics or rubber-bonded ferrite powder can be advantageously used instead of discrete magnets. Such a magnetic material is cheaper than ceramic permanent magnets and its magnetic properties are almost as good. For example an anisotropic magnetic material of this type which is available on the market shows a coercive field strength of 170 kA/m, which value is higher than in existing isotropic ceramic magnets. Plastic or rubber-bonded magnetic materials also make possible a considerable simplification of the manufacture of the discs, since these materials can be manufactured in the form of strip or discs which can easily be machined into the desired shape, for example by cutting, and be attached by gluing or in some other way to a supporting frame of, for example, aluminium, steel or glass-fibre laminate. If the discs are not too large the entire supporting frame of the discs can thus be covered by one single, undivided disc of magnetic material. When larger discs are used, or when it is considered advantageous from other points of view, smaller rectangular, square or sectorshaped pieces of said magnetic material can be attached to the frame of the discs.

BRIEF DESCRIPTION OF THE DRAWINGS

The invention will be explained in more detail by way of example with reference to the accompanying drawing, in which FIG. 1 schematically shows a separator according to the invention, perpendicular to the direction of flow of the medium and without scraper means and transport devices for scraped off material being shown, FIG. 2 the same separator in the direction of flow of the medium with transport devices for scraped-off material but no scraper means being shown (to make the figure more clear), FIG. 3 a gap between two filter discs in the separator according to FIGS. 1 and 2, showing scraper means and transport device, FIG. 4 schematically a filter disc consisting of two walls and discrete magnets arranged between them, in the direction of flow of the medium, FIG. 5 a cross-section of the filter disc according to FIG. 4, FIG. 6 the area A in the filter disc according to FIG. 4, and FIG. 7 a part of a filter disc in which the permanent magnets are made of a plastics or rubber-bonded powder magnetic material.

The magnetic separator according to FIGS. 1 and 2 consists of a plurality of discs 1, each one consisting of two parallel walls 1a and 1b between which permanent magnets are arranged, as will be explained in greater detail in connection with the description of FIGS. 4 and 6. The discs and walls, respectively, are arranged parallel with each other along the shaft 2 of the separator and radially directed. The separator shaft comprises in the exemplified case a central, wider part 2a, flanges 2b and 2c and shaft ends 2d and 2e which are journalled in supports 3a and 3b. The shaft is driven by a motor 4 over a gear 5. The unit consisting of the filter discs mounted on the shaft 2 is arranged in a tank 6 for the medium to be cleaned. The tank inlet is designated 7 and its outlet 8. The medium as it passes the separator is conveyed through the gaps 9 between the discs 1. In that process, ferromagnetic particles with substances — which are to be separated — attached to them adhere to the walls of the separator and accompany the walls during the rotation, which is preferably performed against the direction of flow of the medium.

Figure 1:
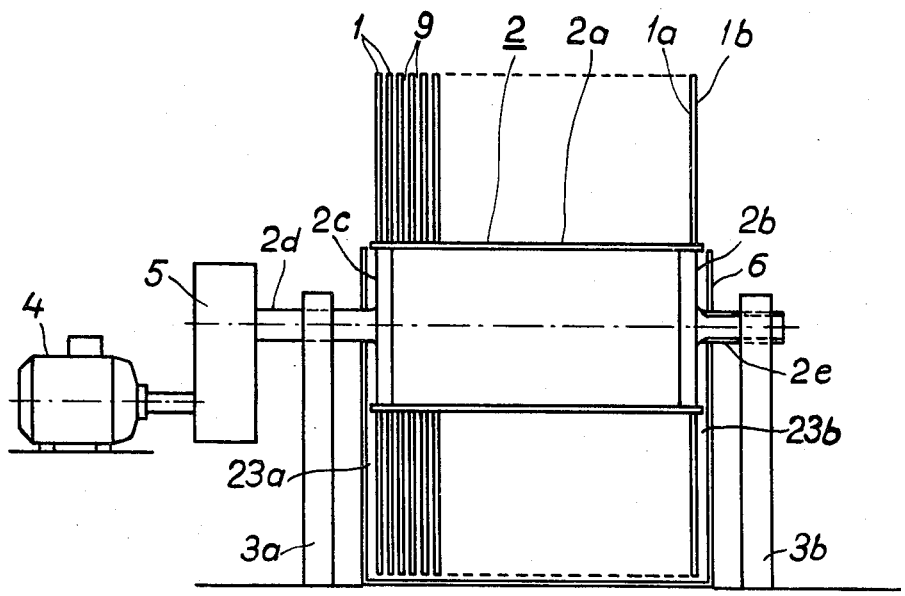
Figure 2:
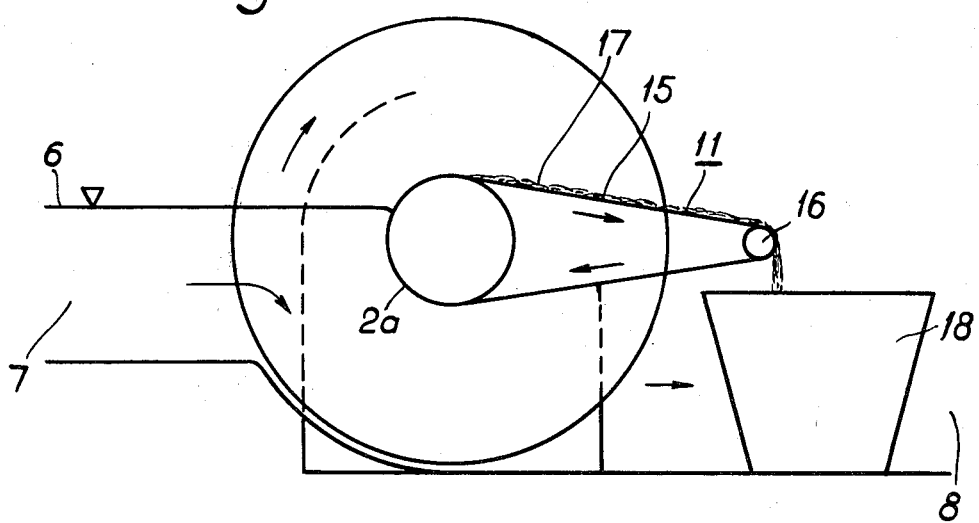
Figure 3:
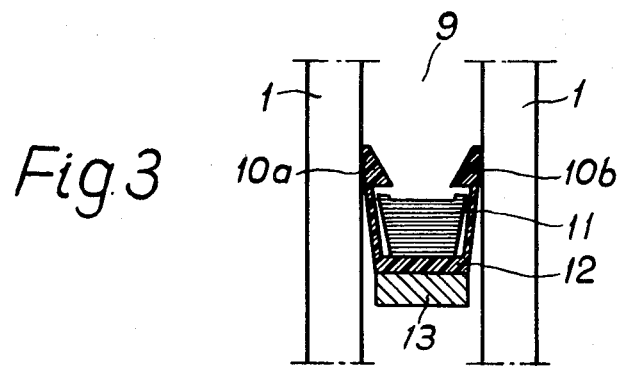
As shown in FIG. 3 the separator is provided with scraper means 10a and 10b arranged above endless transport belts 11. The scraper means and the transport devices are arranged in each gap 9 between the discs and in the gaps 23a and 23b outside the outermost walls. The scraper means are stationary. Each one of them, for example 10a and 10b, may form one separate unit. As in the case shown in FIG. 3, however, they may also form a coherent unit with a gutter 12 located below them, in which a transport belt 11 runs. In the exemplified case, the scraper means are manufactured of polyamide and the coherent unit of scrapers 10a and 10b and gutter 12 is extruded in one piece. The gutter rests on and is anchored to a firm support 13 and the transport belt 11 rests on the gutter bottom. The supports 13 may be anchored to the tank 6 by means of stays (not shown). In the exemplified case, each transport member consists of a belt 15 of stainless steel or of rubber, which, as shown in FIG. 2, surrounds and is driven by the central part 2a of the separator shaft, and surrounds a roll 16 located outside the discs. Each scraper as well as each support 13 extends at least along the entire part of the corresponding belt 15 which is located inside the periphery of the filter discs 1. When the discs rotate, the adhered material is scraped off when passing the scraper means 10a and 10b. The scraped-off material 17 falls down onto and is transported by the belt into a collecting container 18. It is possible to have a simple scraper means arranged at the roll 16 to prevent scraped-off material from being returned to the separator.
Figure 4:
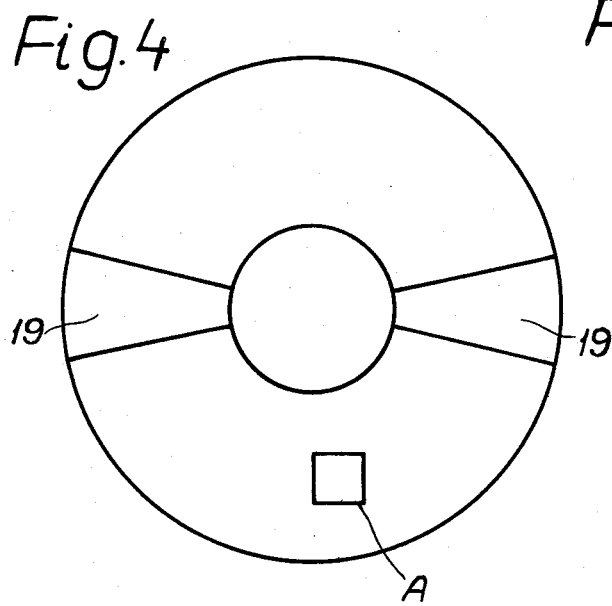
Figure 5:
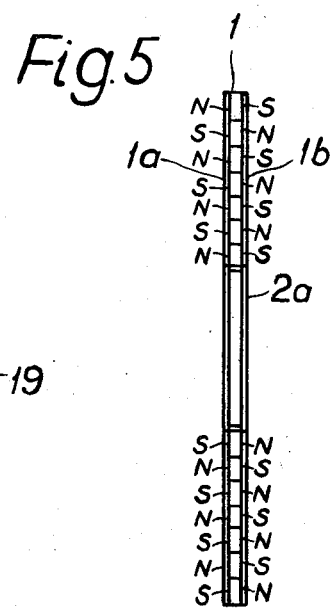
Figure 6:
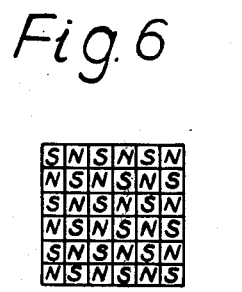

As is clear from FIGS. 4 to 6, each filter disc 1 consists of two walls 1a and 1b, for example of stainless steel having a thickness of 0.5 mm, which are folded over and tightened against each other at their periphery. Between the walls magnets of barium ferrite are closely packed, as is clear from FIGS. 5 and 6. They are also fixed to the walls, for example by an epoxy resin glue. The magnets may, for example, have a length in the magnetizing direction of 5 – 10 mm and an area of 1 – 5 cm$^2$ perpendicular to the magnetizing direction. Two adjacent magnets within the same disc have different polarities in the shown example. In this way a maximum field gradient is formed. In order to strengthen the field gradients, two adjacent discs on the separator shaft should have reversed pole configurations.

From FIG. 4 it is clear that the filter discs may have areas 19, preferably sector-shaped, without magnets in order to facilitate the scraping.

Figure 7:
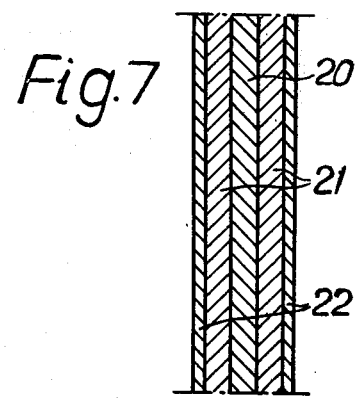

In the embodiment of a filter disc shown in FIG. 7 and which may be used in the separator shown in FIGS. 1 – 4, the filter disc has a supporting frame 20 which may consist of a disc of, for example, aluminium, steel or glass-fibre-reinforced plastic. In certain cases it may be advantageous to use magnetic steel for this purpose (where this is possible considering, e.g., the risk of corrosion), since a strengthening of the magnetic field is obtained in this way. The supporting disc 20 is provided at its two sides with a coating 21 of plastic or rubber-bonded powder magnetic material. Material of this type, consisting of fine powder of, for example, barium or strontium ferrite with, for example, nitrile rubber as the binder, is available on the market in the form of discs or strip. Such a magnetic material has great flexibility and can be easily cut into the desired shape (if the shape of the discs of magnetic material has not been adapted to the application in question already during its manufacture). The coating 21 of magnetic material is attached to the frame 20 by gluing. In this connection it is possible to use either discs of magnetic material which are sufficiently large to cover the entire supporting disc 20, or magnetic material in the form of smaller rectangular, square or sector-shaped pieces. The coating 21 can be advantageously applied with one or more non-magnetized sectors (designated 19 in FIG. 4) of cheaper material, which facilitates the scraping of the particulate material adhering to the surfaces of the discs. The magnetic discs 21 are provided with a wear surface layer 22 of, for example, rubber or stainless sheet metal.

The magnetization of the discs 21 is suitably carried out after the discs have been manufactured and in accordance with the same configuration as is shown in FIGS. 5 and 6 for the separator with discrete magnets.

The filter discs with plastics or rubber-bonded powdered magnetic material can also be constructed in ways other than that described with reference to FIG. 7. For example, the magnetic material can be arranged between two supporting wall discs, which then simultaneously act as wear surface layers.

In the cases exemplified in the figures, the magnets rotate with the discs. However, it is also possible to arrange the magnets stationary and only the walls rotating.

I claim:

1. Magnetic separator comprising a rotatable shaft, a plurality of substantially parallel filter discs which are attached along said shaft and located in planes substantially perpendicular thereto with gaps between the discs for passage of medium which is to be cleaned, said medium when entering the separator containing a ferromagnetic particulate material, said discs containing permanent magnets producing local magnetic field inhomogeneities in the gaps between the discs and the separator being provided with a scraper means for the particulate material which adheres to the discs when the medium passes the gaps, wherein the scraper means comprises a plurality of stationary upwardly open channel members having their opposite edges engaging opposed faces of the discs, and a plurality of endless transport belts which run within the channel members and enter the gaps between the discs and extend outside the discs to a point of discharge of the particulate material, said separator having means to drive the shaft of the separator and the transport belts, said transport belts surrounding the separator shaft and having upper and lower runs, said upper runs moving outwardly with respect to the discs.

2. Magnetic separator according to claim 1, in which the scraper means are constructed of a plastic material.

3. Magnetic separator comprising a rotatable shaft, a plurality of substantially parallel filter discs which are attached along said shaft and substantially perpendicular thereto with gaps between the discs for passage of medium which is to be cleaned, said medium when entering the separator containing a ferromagnetic particulate material, said discs containing permanent magnets producing local magnetic field inhomogeneities in the gaps between the discs and the separator being provided with a scraper means for the particulate material which adheres to the discs when the medium passes the gaps, wherein the scraper means comprises a plurality of stationary members engaging the opposite faces of the discs, and a plurality of endless transport belts which run below the scraper means and enter the gaps between the discs and extend outside the discs to a point of discharge of the particulate material, said separator having means to drive the shaft of the separator and the transport belts, said transport belts surrounding the separator shaft and having upper and lower runs, said upper runs moving outwardly with respect to the discs.

* * * * *